United States Patent
Johnson et al.

(10) Patent No.: US 11,715,054 B1
(45) Date of Patent: *Aug. 1, 2023

(54) COMPUTER SYSTEMS FOR META-ALERT GENERATION BASED ON ALERT VOLUMES

(71) Applicant: Wells Fargo Bank, N.A., San Francisco, CA (US)

(72) Inventors: Daniel Jeffery Johnson, Milwaukee, WI (US); Matthew Todd Brown, Scottsdale, AZ (US); Christopher Smith, Marvin, NC (US); Ruoding Wong, Phoenix, AZ (US); Joe Heger, Arrington, TN (US); Rachel Nemecek, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,107

(22) Filed: Nov. 22, 2021

Related U.S. Application Data

(63) Continuation of application No. 16/710,244, filed on Dec. 11, 2019, now Pat. No. 11,188,861.

(51) Int. Cl.
  *G06Q 10/0635* (2023.01)
  *G06Q 10/0637* (2023.01)
  (Continued)

(52) U.S. Cl.
  CPC ..... *G06Q 10/0635* (2013.01); *G06Q 10/0637* (2013.01); *G06Q 10/06393* (2013.01); *G06Q 20/4016* (2013.01)

(58) Field of Classification Search
  CPC ........... G06Q 10/0635; G06Q 10/0637; G06Q 10/06393; G06Q 20/4016
  (Continued)

(56) References Cited

U.S. PATENT DOCUMENTS

| 8,078,486 B1 | 12/2011 | McLean et al. |
| 8,527,317 B2 | 9/2013 | Haddad |

(Continued)

FOREIGN PATENT DOCUMENTS

| JP | 2004178080 A | 6/2004 |
| WO | 2002027571 A2 | 4/2002 |

OTHER PUBLICATIONS

E. Grigoroudis et al. A survey of customer satisfaction barometers: Some results from the transportation-communications sector. European Journal of Operational Research. vol. 152, Issue 2, Jan. 16, 2004, pp. 334-353.*

(Continued)

*Primary Examiner* — Timothy Padot
(74) *Attorney, Agent, or Firm* — Shumaker & Sieffert, P.A.

(57) ABSTRACT

Techniques are described for automatically generating meta-alerts based on operational and security risk alert volumes for an entity. In particular, a central device receives entity alert information from other devices in a computer system of an enterprise business, which may have office branches that are each staffed by employees. The central device compares alert volumes of a given entity for a given period of time (e.g., a month) to one or more baseline thresholds determined based on the average alert volume of peer entities during the same period of time and the entity's own historical alert volumes to identify spikes or increases in the volume of alerts for the given entity. If the entity is trending high for the period of time, the central device generates a meta-alert to bring awareness to the relatively high volume of alerts identified for that entity.

20 Claims, 10 Drawing Sheets

(51) Int. Cl.
   *G06Q 20/40*       (2012.01)
   *G06Q 10/0639*     (2023.01)

(58) Field of Classification Search
   USPC ...................................................... 705/7.28
   See application file for complete search history.

(56) References Cited

U.S. PATENT DOCUMENTS

| | | | |
|---|---|---|---|
| 8,538,799 | B2 | 9/2013 | Haller et al. |
| 8,706,537 | B1 | 4/2014 | Young et al. |
| 9,733,916 | B2 | 8/2017 | Wang et al. |
| 9,779,386 | B2 | 10/2017 | Swierz, III et al. |
| 9,824,323 | B1 | 11/2017 | Weiss et al. |
| 9,898,767 | B2 | 2/2018 | Psota et al. |
| 9,946,840 | B1 | 4/2018 | Kemp |
| 10,089,120 | B2 | 10/2018 | Baumecker et al. |
| 10,194,028 | B2 | 1/2019 | Vymenets et al. |
| 10,331,302 | B1 | 6/2019 | Leyden et al. |
| 10,509,555 | B2 | 12/2019 | Noel et al. |
| 11,188,861 | B1 | 11/2021 | Johnson et al. |
| 2002/0099580 | A1* | 7/2002 | Eicher, Jr. .......... G06Q 30/0607 705/26.25 |
| 2002/0138338 | A1 | 9/2002 | Trauth et al. |
| 2004/0177053 | A1* | 9/2004 | Donoho .................. G06Q 40/00 707/999.107 |
| 2005/0055275 | A1 | 3/2005 | Newman et al. |
| 2006/0031110 | A1 | 2/2006 | Benbassat et al. |
| 2007/0112607 | A1 | 5/2007 | Tien et al. |
| 2007/0127693 | A1 | 6/2007 | D'Ambrosio et al. |
| 2008/0091621 | A1 | 4/2008 | Breeden |
| 2008/0195428 | A1 | 8/2008 | O'Sullivan |
| 2009/0048884 | A1* | 2/2009 | Olives ..................... G06Q 40/00 705/40 |
| 2010/0121776 | A1 | 5/2010 | Stenger |
| 2011/0261049 | A1 | 10/2011 | Cardno et al. |
| 2012/0032961 | A1 | 2/2012 | Smith et al. |
| 2013/0085799 | A1 | 4/2013 | Zhang et al. |
| 2013/0132275 | A1 | 5/2013 | Enzaldo et al. |
| 2014/0012623 | A1 | 1/2014 | Paulmann |
| 2014/0047096 | A1* | 2/2014 | Kupershmidt .......... H04L 43/08 709/224 |
| 2014/0210827 | A1 | 7/2014 | Alsbury et al. |
| 2014/0258032 | A1 | 9/2014 | Psota et al. |
| 2015/0086003 | A1 | 3/2015 | Khalil et al. |
| 2015/0149233 | A1* | 5/2015 | Chaudhary ...... G06Q 10/06315 705/7.25 |
| 2015/0178825 | A1* | 6/2015 | Huerta ................... G06Q 40/00 705/35 |
| 2015/0329912 | A1 | 11/2015 | Moreno et al. |
| 2015/0332201 | A1 | 11/2015 | Bemnaudin et al. |
| 2015/0332419 | A9 | 11/2015 | Budlong |
| 2016/0088099 | A1* | 3/2016 | Crudele ................ H04L 51/222 709/204 |
| 2017/0068963 | A1 | 3/2017 | Saxena et al. |
| 2017/0345057 | A1 | 11/2017 | Baker, III |
| 2018/0121874 | A1 | 5/2018 | Chen et al. |
| 2018/0165775 | A1 | 6/2018 | Bhattacharjee et al. |
| 2018/0300453 | A1 | 10/2018 | Arnaout et al. |
| 2019/0188616 | A1* | 6/2019 | Urban ................ G06Q 10/0875 |
| 2020/0065151 | A1 | 2/2020 | Ghosh et al. |

OTHER PUBLICATIONS

AI as new tool in banks' crime-fighting bag? Grosman, Penny. American Banker [New York, N.Y] Mar. 13, 2018.*

Americas Software is Helping World's Banks Track Money Laundering. Business Wire Mar. 30, 2000: 1377.*

"Building a customer service alert system that works", Customer Thermometer Retrieved from https://www.customerthermometer.com/customerfeedback/customer-service-alert-system/. May 2019, 5 pages.

Aung, "Operational Risk Management Framework for Service Outsourcing: Consideration of Risk Dimensions and Their Application Into the Framework," International Journal of Electronic Business Management, vol. 6, No. 3, Jan. 2008, 11 pp.

Grigoroudis et al. "A survey of customer satisfaction barometers: Some results from the transportation-communications sector", European Journal of Operational Research, vol. 152, Issue 2, Jan. 16, 2004, pp. 334-353.

Rahim, "Perceived Operational Risk Management and Customer Complaints in Malaysian Conventional Banking Industry" Advanced Science Letters, vol. 21, No. 4, Apr. 2015, 6 pp.

U.S. Appl. No. 16/447,567, filed Jun. 20, 2019, naming inventors Johnson et al.

U.S. Appl. No. 16/710,289, filed Dec. 11, 2019, naming inventors Johnson et al.

U.S. Appl. No. 17/099,674, filed Nov. 16, 2020, naming inventors Bowers et al.

Prosecution History from U.S. Appl. No. 16/710,244, dated Feb. 3, 2021 through Aug. 5, 2021, 56 pp.

Yusof et al., "Intrusion alert correlation technique analysis for heterogeneous log", IJCSNS International Journal of Computer Science and Network Security, vol. 8, No. 9, Sep. 2008, pp. 132-138.

* cited by examiner

COMPUTER SYSTEMS FOR META-ALERT GENERATION BASED ON ALERT VOLUMES

This application is a continuation of U.S. patent application Ser. No. 16/710,244, filed Dec. 11, 2019, the entire contents of which is incorporated herein by reference.

TECHNICAL FIELD

This disclosure relates to computer systems that that receive and process operational and security alerts.

BACKGROUND

In various industries and processes, customers and other actors tend to act within a range of expected behaviors. In some cases, actions outside of the range of expected behaviors can be seen as anomalous, which may indicate potentially risky behavior. That is, when an actor takes an action that is not within the range of expected behaviors, the action may indicate that the actor is acting outside of operational or security guidelines. Thus, management may want to further analyze the actor and/or the action to determine whether corrective action and/or training is warranted. In some industries, e.g., the banking industry, certain operational risks must be resolved according to industry standards or regulations. To help users address potential risks, computer systems may output alerts that flag actors and/or actions for review.

SUMMARY

In general, this disclosure describes computer systems for generating meta-alerts (e.g., alerts about alerts) based on operational and security risk alert volumes for an entity, e.g., an office branch or an employee. In particular, a central device (e.g., a server) receives entity alert information from other devices in a computer system of an enterprise business, which may be a financial institution having a plurality of office branches (e.g., bank branches, lending offices, and other offices) that are each staffed by team members (i.e., employees). The central device compares alert volumes of a given entity for a given period of time (e.g., a month) to one or more baseline thresholds determined based on the average alert volume of peer entities during the same period of time and the entity's own historical alert volumes to identify spikes or increases in the volume of alerts for the given entity. If the entity is trending high for the period of time, the central device generates a meta-alert to bring awareness to the relatively high volume of alerts identified for that entity. For example, if a current alert volume for the entity is greater than to its own historic alert volume (e.g., that entity's alert volume for the previous month) or its peer group's alert volume by a threshold amount, the central device may generate a meta-alert (e.g., a warning). If a current alert volume for the entity is greater than to its own historic alert volume and greater than its peer group's alert volume by a threshold amount, the central device may generate an elevated meta-alert (e.g., a higher escalated warning). In some examples, these meta-alerts may be used to create reports for management to track or monitor the branches and employees under their supervision. In this way, the central device may help management identify coaching or training opportunities to reduce risky behaviors.

In one example, this disclosure is directed to a method including determining, by a processor implemented in circuitry, an alert volume during a first period of time by an entity corresponding to an enterprise business comprising a plurality of entities; determining, by the processor, a baseline threshold; determining, by the processor, that the alert volume for the entity during the first period of time is greater than or equal to the baseline threshold; in response to the determination that the alert volume for the first period of time is greater than or equal to the baseline threshold, generating, by the processor, a meta-alert; and outputting, by the processor, the meta-alert.

In another example, this disclosure is directed to a method including segmenting, by a processor implemented in circuitry, a plurality of entities of an enterprise business into peer entity groups; determining, by the processor, an average peer alert volume during a first period of time for a peer entity group corresponding to the entity; determining, by the processor, an alert volume during the first period of time by the entity; determining, by the processor, an historic alert volume for the entity during a second period of time, before the first period of time; and generating, by the processor, a meta-alert based on the alert volume being greater than or equal to at least one of the average peer alert volume or the historic alert volume.

In another example, this disclosure is directed to a device including device comprising a processor implemented in circuitry and configured to: determine an alert volume during a first period of time by an entity corresponding to an enterprise business comprising a plurality of entities; determine a baseline threshold; determine that the alert volume for the entity during the first period of time is greater than or equal to the baseline threshold; in response to the determination that the alert volume for the first period of time is greater than or equal to the baseline threshold, generate a meta-alert; and output the meta-alert.

The details of one or more examples are set forth in the accompanying drawings and the description below. Other features, objects, and advantages will be apparent from the description and drawings, and from the claims.

DETAILED DESCRIPTION

Figure 1:
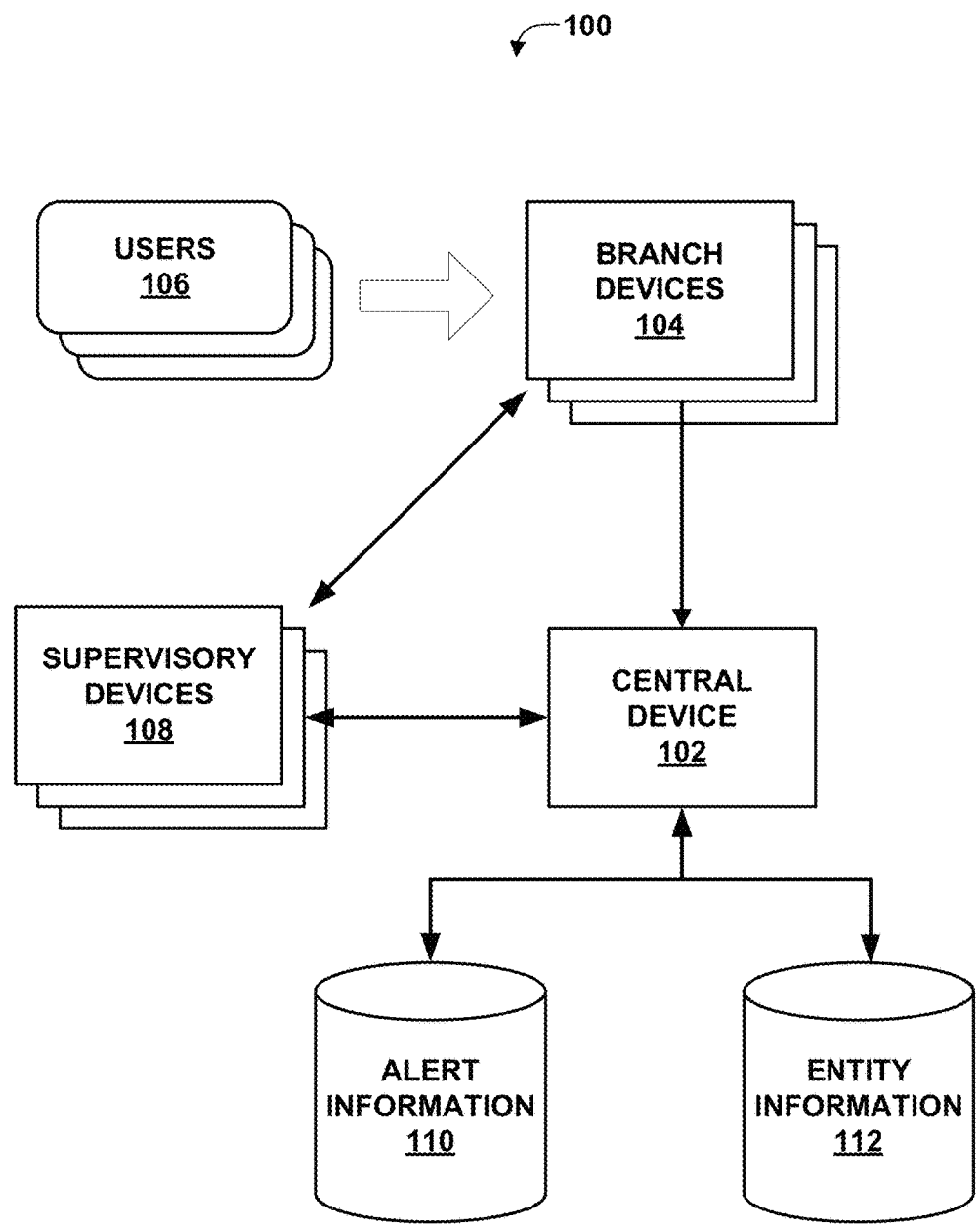
FIG. 1 is a block diagram illustrating an example computing system configured to generate meta-alerts according to the techniques of this disclosure.

FIG. 1 is a block diagram illustrating an example computing system 100 configured to generate meta-alerts (e.g., alerts about alerts) according to the techniques of this disclosure. In particular, system 100 includes branch devices 104, central device 102, and supervisory devices 108. Branch devices 104 represent examples of various types of computers that may be used by users 106, e.g., for performing tasks for customers. Central device 102 represents an example of a central system of record that, according to the techniques of this disclosure, periodically analyzes the number of alerts issued during a period time (e.g., a month) and outputs meta-alerts for display at supervisory devices 108.

In general, users 106 (who may be employees at a branch of a business enterprise, such as a bank or other office) may assist customers with various transactions. For example, for a bank, a customer may open an account, deposit or withdraw funds to or from an account, open a line of credit or credit card, close an account, or the like. In some instances, users 106 may determine that a transaction performed by or on behalf a customer or potential customer represents an anomalous or abnormal behavior. For instance, not funding a new checking or savings account within a certain period of time (e.g., 1 day, 5 days), not providing signatures or other information on an application (e.g., phone number, email), performing a transaction that overdraws an account, opening and closing an account on the same day, or other such abnormal behaviors may merit additional attention. In response, one of users 106 may issue an alert via a respective one of branch devices 104 to central device 102, one or more supervisory devices 108, or any other computing device. In some examples, users 106 may issue alerts using respective branch devices 104 via an enterprise access portal. In some examples, alerts may be issued automatically by branch devices 104.

In some examples, central device 102 may receive alert information and entity information from branch devices 104 and/or supervisory devices 108. The alert information may include individual alerts and/or the number of alerts issued corresponding to each entity of the enterprise business (e.g., an employee, a branch, a district, region, or group). In the examples in which central device 102 receives alerts, central device 102 may be configured to determine the alert information, including the number of alerts issued corresponding to each entity of the enterprise business. When the entity is a branch of the business enterprise, the entity information may include branch information, such as the number of accounts that each branch manages, the number of employees at each branch, an urbanity score, and the like. In some examples, the urbanity score may be an objective evaluation provided by subject matter experts of how urban or rural the geographical area in which a particular branch is located (e.g., a numerical value between 1.0 and 10.0 or any other range). In some examples, the urbanity score of a branch may change over time. When the entity is an employee of the business enterprise, the entity information may include employee information, such as the average number customers assisted over a period of time (e.g., a month, a quarter, six months, a year, or any other period of time), the average number of transactions performed during the same period of time, the average tenure (e.g., in the employee's current role), and the like. Central device 102 may store alert information and entity information in alert information database 110 and entity information database 112, respectively.

Central device 102, according to the techniques of this disclosure, may periodically (e.g., weekly, monthly, quarterly, or any other interval of time) compare alert volumes of a given entity for a period of time (e.g., a week, month, quarter, or any other period of time) to one or more baseline thresholds. For example, central device 102 may calculate or obtain (e.g., from branch devices 104, supervisory devices 108, or alert information database 110) the alert volume of the alerts issued during the period of time corresponding the entity, determine the one or more baseline thresholds and output a meta-alert (e.g., an alert about the alerts corresponding to the entity) if the alert volume corresponding to the entity exceeds the one or more baseline thresholds. In some examples, the one or more baseline thresholds may be based on the average alert volume of peer entities during the same period of time (e.g., a peer baseline threshold) and the entity's own historical alert volumes (e.g., a historic baseline threshold). In some examples, the historic baseline threshold may be based on the entity's previous alert volume (e.g., last month's alert volume), the average alert volume over a particular period of time (e.g., the last 6 months or any other period of time), or the entity's average alert volume over the same period of time in the last few years (e.g., to account for sessional spikes). In some examples, the one or more baseline thresholds may be manually set or changed by a computing device (e.g., a supervisory device 108).

To determine peer baselines thresholds, central device 102 may segment the entities of the enterprise business peer entities based on the entity information from entity information database 112. For example, central device 102 may segment branches into peer branches based on the number of accounts that each branch manages, the number of employees at each branch, and an urbanity score for each branch. Similarly, central device 102 may segment employees into peer employees based on the number customers assisted over a period of time (e.g., a month, a quarter, six months, a year, or any other period of time), the number of transactions performed during the same period of time, and the tenure (e.g., in the employee's current role). Once central device 102 segments the entities into peer entities, central device 102 may determine a peer baseline thresholds based on the average alert volume over a particular period of time (e.g., last month, quarter, year, or any other period of time) for each peer entity group and compare the entity's alert volume to its corresponding peer baseline threshold. In this way, central device 102 may compare entities at similar granularities for apples-to-apples comparisons.

Central device 102 may store alert information and entity information in alert information database 110 and entity information database 112, respectively. For example, central device 102 may store each respective alert volume corresponding to each respective entity of the enterprise business and/or the average alert volume for each entity peer group in alert information database 110. Similarly, central device 102 may store branch information, employee information, and/or peer entity information, including peer entity group designations, average alert volume for each peer entity group for a particular period time, in entity information database 112. In some examples, central device 102 may store alert and entity information in local memory.

Central device 102 may output or transmit meta-alerts representative of spikes in alert volume for one or more entities, as described in further detail below. In some examples, central device 102 outputs individual meta-alerts to one or more supervisory devices 108 (e.g., on a per-entity basis). In some examples, central device 102 or each of supervisory devices 108 generates a report including meta-alert information for each entity under each manager's supervision. In this way, management may investigate spikes in alert volume for particular entities.

The techniques performed by central device 102 may generally improve performance of central device 102, branch devices 104, supervisory devices 108, and system 100, as well as other similar systems, thereby improving the field of alert volume analysis. For example, computer-based alert systems can produce high volumes of alerts that can be difficult to parse and identify trends for a particular entity. Techniques in accordance with this disclosure may help management easily identify coaching or training opportunities to reduce risky behaviors by outputting meta-alerts that identify trends or spikes in alert volumes for specific entities. By focusing management's attention to particular entities, processing loads and power consumption of system 100 may be reduced without having to manually run multiple queries on large data sets.

For purposes of example and explanation, the techniques in this disclosure are explained with respect to alert volumes. However, it should be understood that the same techniques may be applied to other data volumes. For example, the techniques in accordance with this disclosure may be applied to customer complaints, customer survey ratings, and the like.

Figure 2:
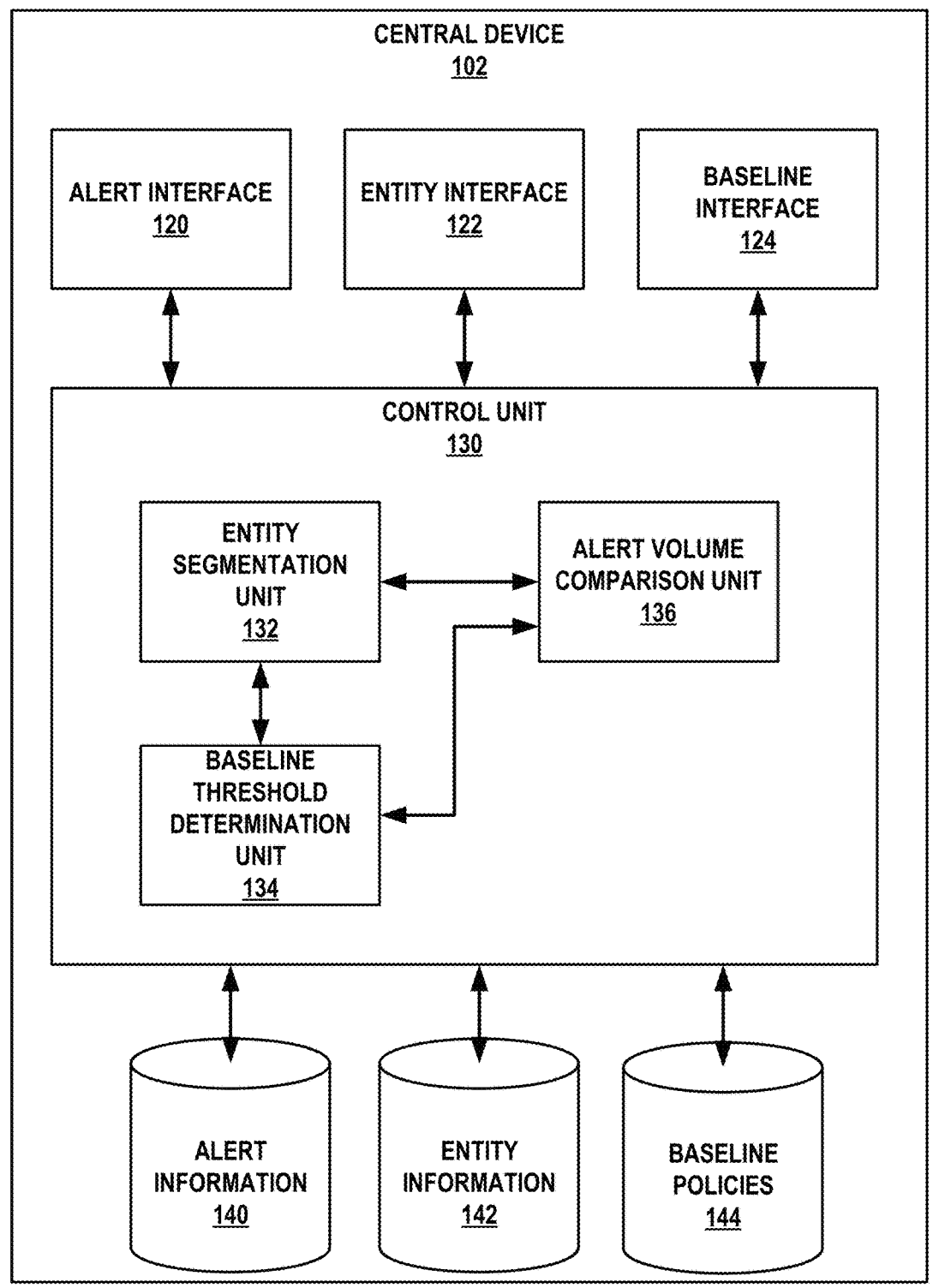
FIG. 2 is a block diagram illustrating an example set of components of a server configured to perform the techniques of this disclosure.

FIG. 2 is a block diagram illustrating an example set of components of central device 102 of FIG. 1, which may be configured to perform the techniques of this disclosure. In the example of FIG. 2, central device 102 includes alert interface 120, entity interface 122, baseline interface 124, control unit 130, alert information database 140, entity information database 142, and baseline policies database 144. Control unit 130 further includes entity segmentation unit 132, baseline threshold determination unit 134, and alert volume comparison unit 136.

Alert information database 140, entity information database 142, and baseline policies database 144 represent one or more respective computer-readable storage media, which may be included within central device 102 as shown in the example of FIG. 2. Alternatively, one or more of alert information database 140, entity information database 142, and baseline policies database 144 may be stored in one or more remote devices to which central device 102 may be communicatively coupled (e.g., alert data database 110, entity information database 112 of FIG. 1). The computer-readable storage media may be one or more of a hard disk, a flash drive, random access memory (RAM), or other such computer-readable storage media.

Alert interface 120, entity interface 122, and baseline interface 124 represent interfaces for receiving alert information (including alerts themselves), entity information, and baseline information, respectively. For example, alert interface 120, entity interface 122, and baseline interface 124 may represent one or more of a network interface, user interfaces (e.g., a keyboard, mouse, touchscreen, command line interface, graphical user interface (GUI), or the like), monitors or other display devices, or other such interfaces for receiving input from and providing output to users and other computing devices either directly or remotely. In accordance with the techniques of this disclosure, central device 102 receives alert information, entity information, and baseline information from branch devices 104 and/or supervisory devices 108 of FIG. 1 via alert interface 120, entity interface 122, and/or baseline interface 124, respectively. For example, supervisory devices 108 may transmit baseline threshold values from supervisory devices 108 via baseline interface 124.

Control unit 130 represents one or more hardware-based processing units implemented in circuitry. For example, control unit 130 and the components thereof (e.g., entity segmentation unit 132, baseline threshold determination unit 134, alert volume comparison unit 136, and meta-alert generation unit) may represent any of one or more processing units, such as microprocessors, digital signal processors (DSPs), field programmable gate arrays (FPGAs), application specific integrated circuits (ASICs), or other such fixed function and/or programmable processing elements. Control unit 130 may further include a memory for storing software and/or firmware instructions to be executed by the processing units thereof. Thus, the functionality of control unit 130, entity segmentation unit 132, baseline threshold determination unit 134, and alert volume comparison unit 136 may be implemented in any combination of hardware, software, and/or firmware, where software and firmware instructions may be executed by hardware-based processing units implemented in circuitry.

In accordance with the techniques of this disclosure, entity segmentation unit 132 segments entities of a business enterprise into peer entity groups based on data from entity information database 142. In particular, entity segmentation unit 132 may segment branches of the enterprise business into peer branch groups or employees of the enterprise business into peer entity groups. For example, entity segmentation unit 132 may segment branches into peer branch groups based on the number of accounts that each branch manages, the number of employees at each branch, and an urbanity score for each branch. The peer branch groups may range from very large branches to very small branches with any number of groups in between. Entity segmentation unit 132 may also segment employees into peer employee groups based on the number customers assisted over a period of time (e.g., a month, a quarter, six months, a year, or any other period of time), the number of transactions performed during the same period of time, and the tenure (e.g., in the employee's current role). The peer employee groups may range from very high activity to very low activity with any number of groups in between. In some examples, entity segmentation unit 132 may use any grouping or clustering techniques (e.g., k-means clustering, mean-shift clustering, hierarchical clustering). In some examples, entity segmentation unit 132 segments entities of a business enterprise into peer entity groups periodically (e.g., monthly).

In accordance with the techniques of this disclosure, baseline threshold determination unit 134 may determine the one or more baseline thresholds for comparison to an entity's alert volume. In some examples, baseline threshold determination unit 134 may determine a peer baseline threshold based on the average alert volume of peer entities during a period of time (e.g., the previous month). For example, baseline threshold determination unit 134 may set a peer baseline threshold to be a value equal to or above (e.g., one or more standard deviations, 100%, 150%, 200% or any other amount) the average alert volume of peer entities during a period of time, as defined by baseline policies database 144. In some examples, baseline threshold determination unit 134 may determine a historic baseline threshold based on the entity's own historical alert volumes. For example, baseline threshold determination unit 134 may set a historic baseline threshold to be a value equal to or above (e.g., one or more standard deviations, 100%, 150%, 200% or any other amount) the entity's previous alert volume (e.g., last month's alert volume), the entity's average alert volume over a particular period of time (e.g., the last 6 months or any other period of time), or the entity's average alert volume over the same period of time in the last few years, as defined by baseline policies database 144. In some examples, the one or more baseline thresholds may be manually set or changed by a computing device (e.g., a supervisory device 108) via baseline interface 124. In some examples, baseline threshold determination unit 134 will set the one or more baseline thresholds to be a floor calibration value (e.g., as defined in baseline policies 144) if the above determinations would result in one or more baseline thresholds below a floor calibration value.

In accordance with the techniques of this disclosure, alert comparison unit 136 may compare an entity's alert volume to the one or more baseline thresholds and generate a meta-alert in response to determining that the entity's alert volume exceeds one or more baseline thresholds. For example, alert comparison unit 136 may generate a "high level" meta-alert in response to determining that the entity's alert volume is equal to or greater than a peer baseline threshold and a historic baseline threshold. A high level meta-alert may flag highly risky activity because it indicates a spike in alerts corresponding to an entity as compared to that entity's past performance and the average alert volume of that entity's peers. In another example, alert comparison unit 136 may generate a meta-alert "warning" in response to determining that the entity's alert volume is equal to or greater than a peer baseline threshold but not equal to or greater than a historic baseline threshold. A meta-alert warning may flag potentially risky activity because it indicates a spike in alerts corresponding to an entity as compared to the average alert volume of that entity's peers but not its own past performance. In yet another example, alert comparison unit 136 may generate a meta-alert "early warning" in response to determining that the entity's alert volume is equal to or greater than a historic baseline threshold but not equal to or greater than a peer baseline threshold. A meta-alert warning may flag potentially risky activity because it indicates an upward trend in alerts corresponding to an entity as compared to its own past performance but not the average alert volume of that entity's peers (e.g., because of a change in policy resulting in increased alerts across the business enterprise).

In some examples, entity segmentation unit 132 may store entity peer grouping information in entity information database 142. In some examples, alert volume comparison unit 134 may store alert volume information in alert information database 140. For example, alert volume comparison unit 134 may store each respective alert volume corresponding to each respective entity and the average alert volume peer entity group in alert information database 140.

Figure 3:
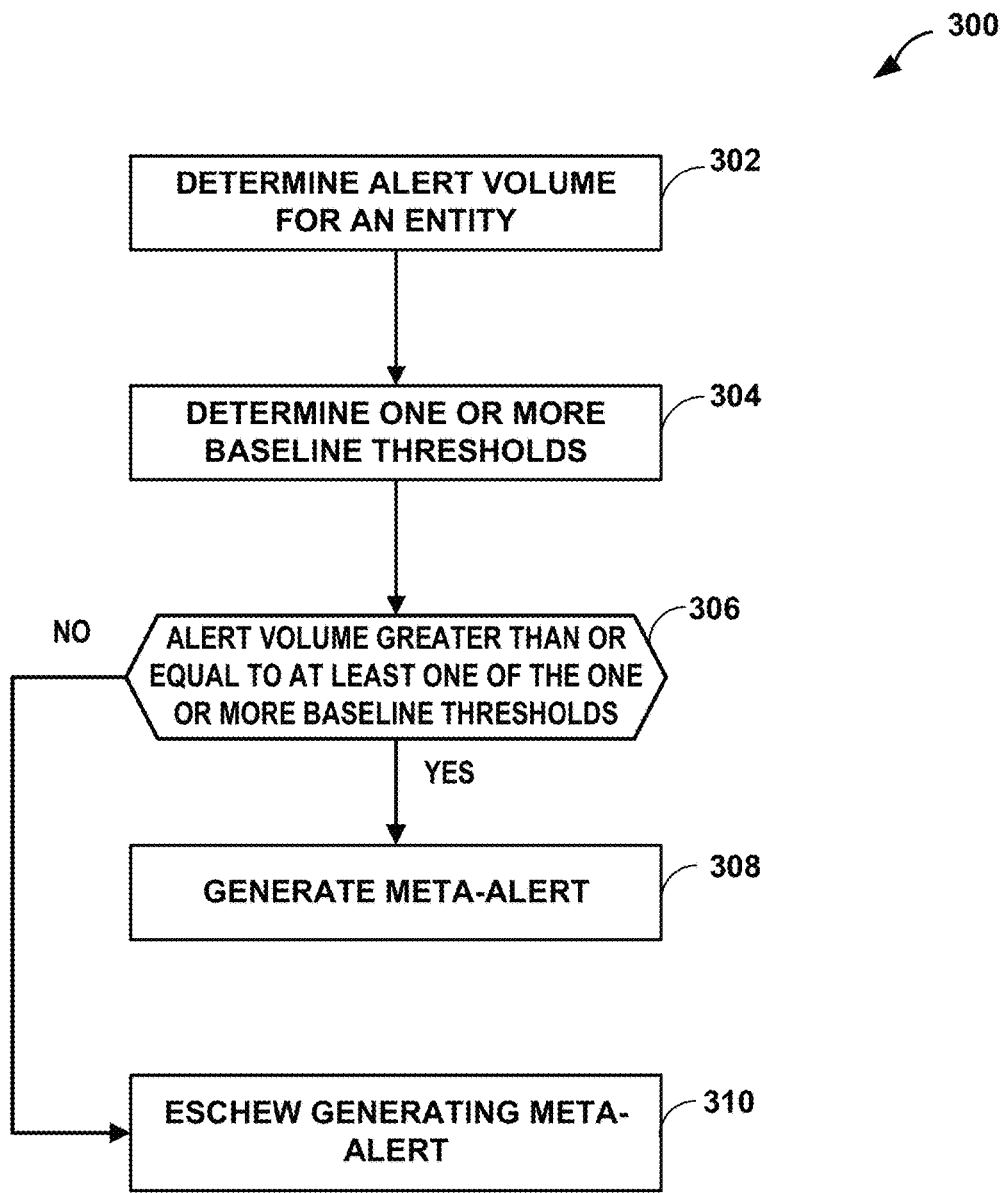
FIG. 3 is a flowchart illustrating an example method of generating meta-alerts according to the techniques of this disclosure.

FIG. 3 is a flowchart 300 illustrating an example method of generating meta-alerts according to the techniques of this disclosure. For purposes of example and explanation, the method of FIG. 3 is explained with respect to central device 102 of FIGS. 1 and 2. However, it should be understood that other computer devices may be configured to perform this or a similar method. In some examples, the method of FIG. 3 may be performed periodically (e.g., weekly, monthly, quarterly, yearly, or any other interval of time).

Initially, central device 102 determines an alert volume for an entity (302). For example, central device 102 may receive a plurality of alerts corresponding to the entity during a period of time (e.g., a month) and central device 102 may keep track of the number of alerts as they are received during the period of time or sum up the total at the end of the period of time. In some examples, control device 102 receives alert volume information for the entity from branch devices 104 or supervisory devices 108 (e.g., periodically or in response to a request from control device 102). Central device 102 determines one or more baseline thresholds (304). For example, central device 102 may determine a peer baseline threshold based on the average alert volume of peer entities during a period of time (e.g., the previous month) and/or a historic baseline threshold based on the entity's own historical alert volumes. In some examples, central device 102 may receive the one or more baseline thresholds from one or more supervisory devices 108 via baseline interface 124.

Central device 102 then compares the entity's alert volume to the one or more baseline thresholds (306). If the entity's alert volume is greater than or equal to at least one of the one or more baseline thresholds (YES branch of 306), central device 102 will generate a meta-alert indicating the spike in alert volume for the entity (308). For example, central device 102 may generate a "high level" meta-alert in response to determining that the entity's alert volume is equal to or greater than a peer baseline threshold and a historic baseline threshold, a meta-alert "warning" in response to determining that the entity's alert volume is equal to or greater than a peer baseline threshold but not equal to or greater than a historic baseline threshold, or a meta-alert "early warning" in response to determining that the entity's alert volume is equal to or greater than a historic baseline threshold but not equal to or greater than a peer baseline threshold. In some examples, central device 102 may generate a report based on the generated meta-alert information for each entity under each manager's supervision. In this way, the meta-alerts may be used to bring awareness of declining and negative behavior to a branch manager or a district manager in order to correct the behavior in a timely fashion and, potentially, before the behavior creates issues with customers and/or regulators. If the entity's alert volume is not greater than or equal to at least one of the one or more baseline thresholds (NO branch of 306), central device 102 will eschew generating a meta-alert (310).

Figure 4:
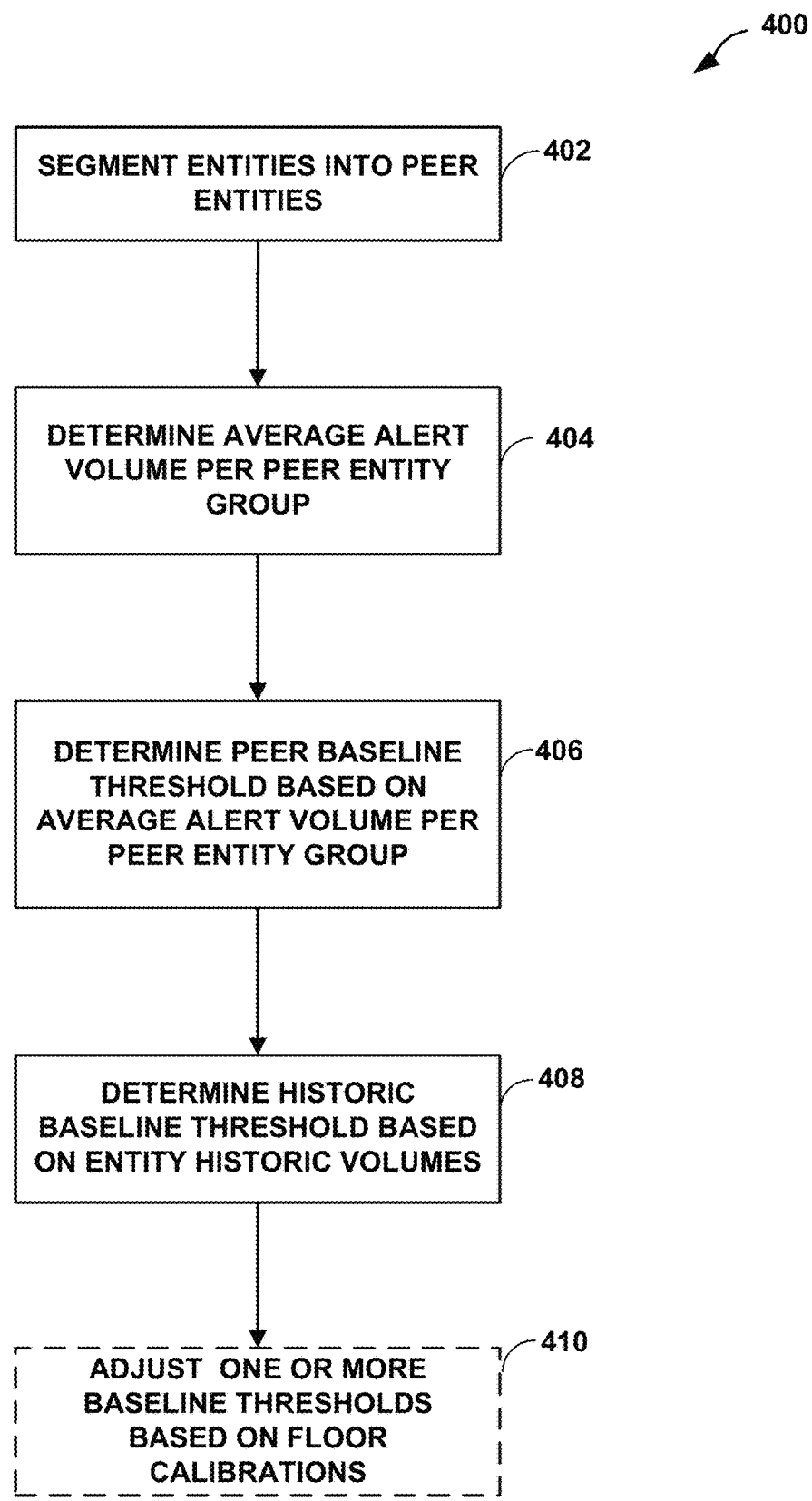
FIG. 4 is a flowchart illustrating an example method of determining a baseline threshold according to the techniques of this disclosure.

FIG. 4 is a flowchart 400 illustrating an example method of determining a baseline threshold according to the techniques of this disclosure. For purposes of example and explanation, the method of FIG. 4 is explained with respect to central device 102 of FIGS. 1 and 2. However, it should be understood that other computer devices may be configured to perform this or a similar method.

Central device 102 segments the plurality of entities of the business enterprise into peer entity groups (402). For example, central device 102 may segment branches into peer branches based on the number of accounts that each branch manages, the number of employees at each branch, and an urbanity score for each branch. Similarly, central device 102 may segment employees into peer employees based on the number customers assisted over a period of time (e.g., a month, a quarter, six months, a year, or any other period of time), the number of transactions performed during the same period of time, and the tenure (e.g., in the employee's current role).

Central device 102 determines the average alert volume per peer entity group (404). For example, central device 102 may receive a plurality of alerts during a period of time (e.g., a month) and central device 102 may sum up the total for each peer entity group at the end of the period of time. In some examples, control device 102 receives alert volume information for each entity from branch devices 104 or for each peer entity group from supervisory devices 108 (e.g., periodically or in response to a request from control device 102).

Central device 102 determines a peer baseline threshold for each peer entity group based on the average alert volumes of each peer entity group during a period of time (e.g., the previous month) (406). For example, central device 102 may determine a peer baseline threshold for a particular entity to be one or more standard deviations above the average alert volume of that entity's peer entity group during the previous month. In another example, central device 102 may determine a peer baseline threshold for a particular entity to be a certain amount (e.g., 100%, 150% or any other delta) above the average alert volume of that entity's peer entity group during the previous month. In some examples, central device 102 determines the peer baseline threshold for each peer entity group to be the average alert volume of the respective peer entity group. Central device 102 also determines historic baseline thresholds based on each entity's own historical alert volumes (408). In some examples, the historic alert volume may include entity's previous alert volume (e.g., last month's alert volume), the average alert volume over a particular period of time (e.g., the last 6 months or any other period of time), or each entity's average alert volume over the same period of time in the last few years (e.g., to account for sessional spikes). For example, central device 102 may determine a historic baseline threshold for a particular entity to be one or more standard deviations above that entity's alert volume during the previous month. In another example, central device 102 may determine a historic baseline threshold for a particular entity to be a certain amount (e.g., 100%, 150% or any other amount) above that entity's alert volume during the previous month. In some examples, central device 102 determines the historic baseline thresholds to be the respective entity's own historical alert volume.

In some examples, central device 102 may also adjust one or more baseline threshold based on floor calibrations (410). For example, a particular entity's alert volume during the previous month may have been very low (e.g., under 10 alerts), which would result in the central device 102 determining a very low historic baseline threshold for that entity. To avoid generating potentially unnecessary meta-alerts, central device 102 may determine one or more baseline thresholds to be set to a floor calibration (e.g., as defined in baseline policies 144 of FIG. 2). For example, a floor calibration for a baseline threshold may be a certain alert volume (e.g., 50 alerts, 100 alerts, 1000 alerts, or any number of alerts) and central device 102 may set the baseline threshold (e.g., peer baseline threshold and/or historic baseline threshold) to be the floor calibration in response to determining a baseline threshold below that floor calibration volume.

Figure 5:
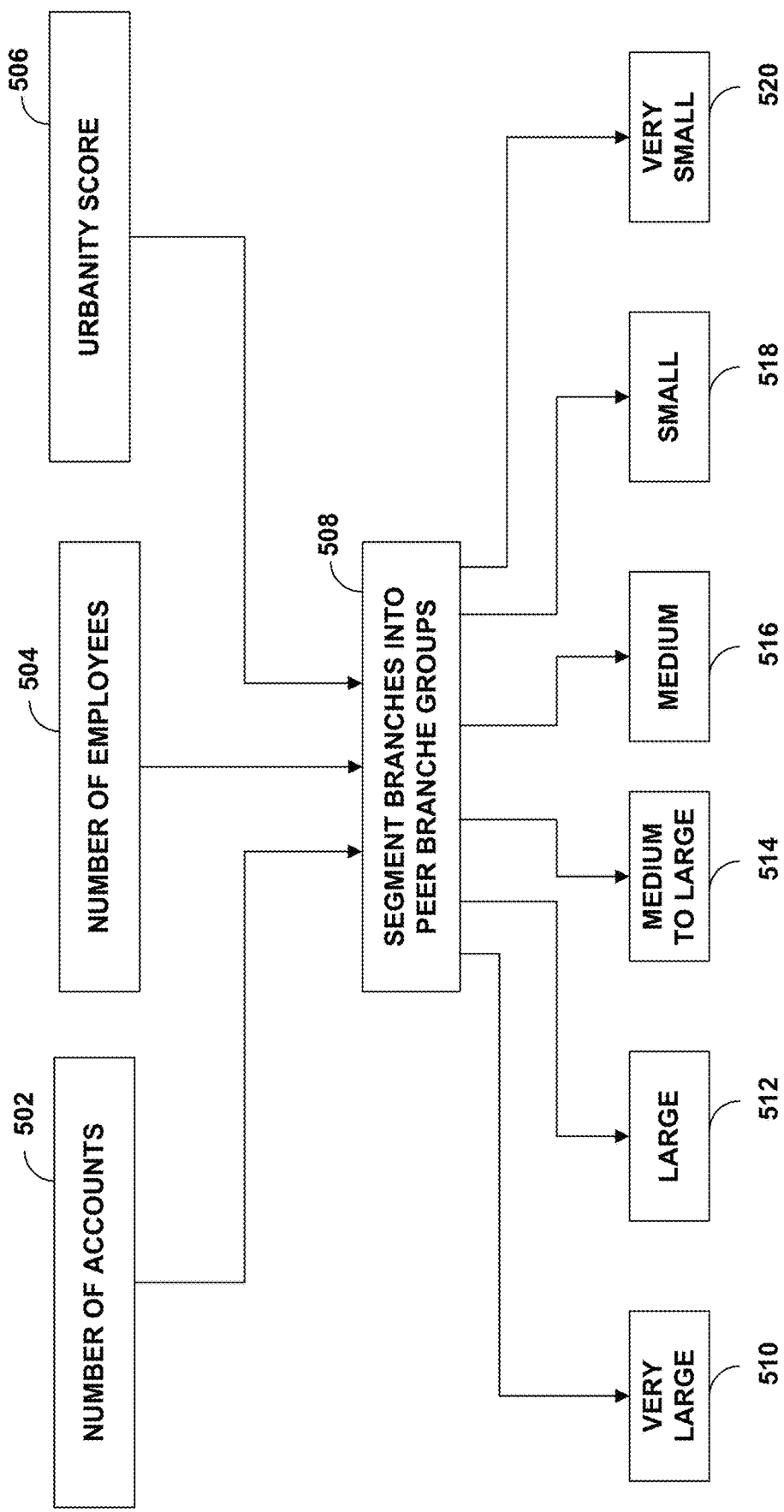
FIG. 5 is a conceptual diagram illustrating an example method of segmenting branches into peer branch groups according to the techniques of this disclosure.

FIG. 5 is a conceptual diagram illustrating an example method of segmenting branches into peer branch groups according to the techniques of this disclosure. For purposes of example and explanation, the method of FIG. 5 is explained with respect to central device 102 of FIGS. 1 and 2. However, it should be understood that other computer devices may be configured to perform this or a similar method.

In the example shown in FIG. 5, central device 102 segments the branches of a business enterprise (508) into a plurality of peer groups. Central device 102 uses as inputs the number of accounts for each branch (502), the number of employees at each branch (504), and an urbanity score for each branch (506) In some examples, the urbanity score may be an objective evaluation provided by subject matter experts of how urban or rural the geographical area in which a particular branch is located. In some examples, the urbanity score of a branch may change over time. While three inputs are shown in FIG. 5, it should be understood that fewer or more inputs may be used to segment branches into a plurality of peer groups. Central device 102 produces as output the one or more branches that are associate with each peer branch group. In this example, the peer branch groups include a very large branch peer group (510), large branch peer group (512), medium to large branch peer group (514), medium branch peer group (516), small branch peer group (518), and a very small branch peer group (520). While six peer branch groups are shown in FIG. 5, it should be understood that fewer or more peer branch groups may be used to segment branches of a business enterprise.

In some examples, central device 102 may use any grouping or clustering techniques (e.g., k-means clustering, mean-shift clustering, hierarchical clustering) to segment the branches of a business enterprise into a plurality of peer branch groups at 508. In the example shown in FIG. 5, central device 102 may use k-means clustering with three-dimensional data inputs (i.e., 502, 504, and 506) and six cluster outputs (i.e., k=6, corresponding to peer branch groups 510, 512, 514, 516, 518, and 520). In some examples, central device 102 segments entities of a business enterprise into peer entity groups periodically (e.g., monthly).

Figures 6A, 6B, 6C:
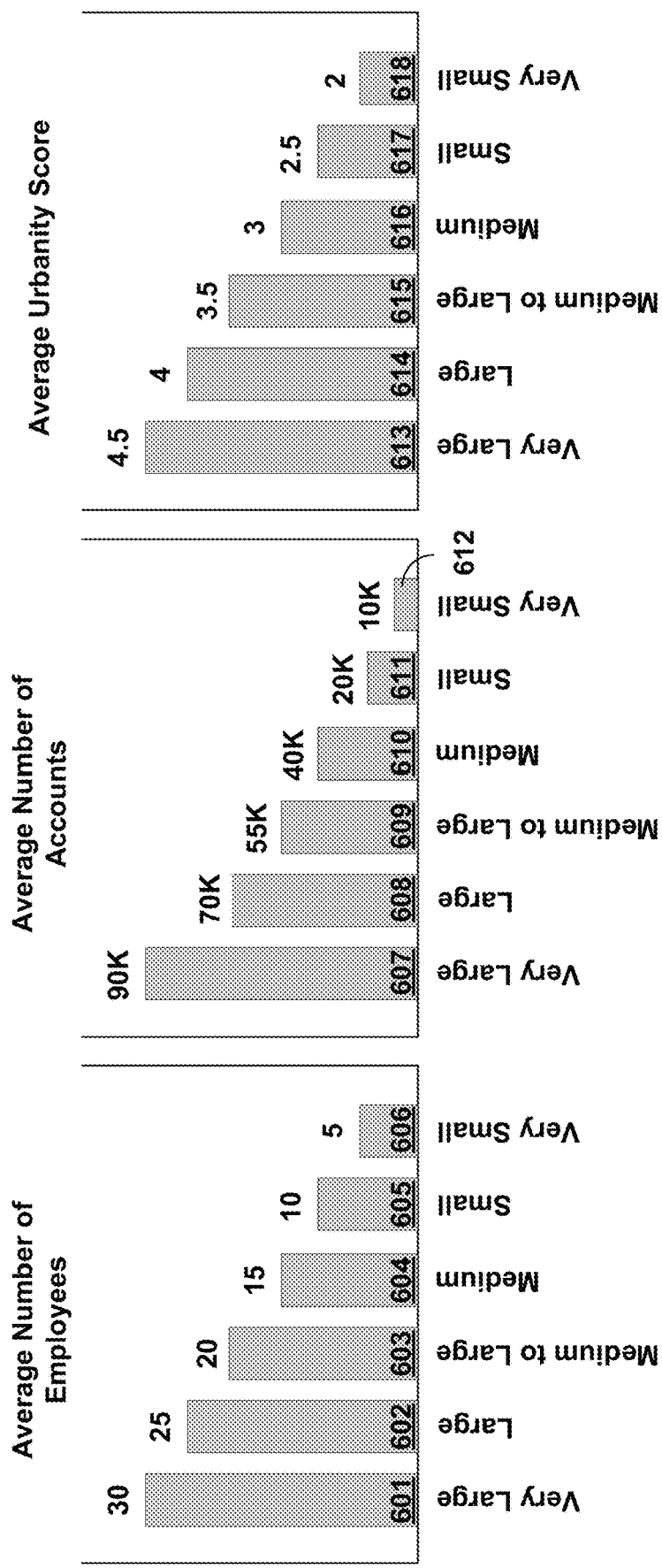
FIG. 6A is a graph illustrating example average number of employees by peer branch groups according to the techniques of this disclosure.
FIG. 6B is a graph illustrating example average number of accounts by peer branch groups according to the techniques of this disclosure.
FIG. 6C is a graph illustrating example average urbanity scores by peer branch groups according to the techniques of this disclosure.

FIG. 6A is a graph illustrating example average number of employees by peer branch groups according to the techniques of this disclosure. The graph in the example shown in FIG. 6A includes bars 602-606 corresponding to the peer branch groups very large through very small, respective. For example, FIG. 6A shows that the very large branch peer group has 30 employees on average, the large branch peer group has 25 employees on average, the medium to large branch peer group has 20 employees on average, the medium branch peer group has 15 employees on average, the small branch peer group has 10 employees on average, and the very small branch peer group has 5 employees on average.

FIG. 6B is a graph illustrating example average number of accounts by peer branch groups according to the techniques of this disclosure. The graph in the example shown in FIG. 6B includes bars 607-612 corresponding to the peer branch groups very large through very small, respective. For example, FIG. 6B shows that the very large branch peer group has 90K accounts on average, the large branch peer group has 70K accounts on average, the medium to large branch peer group has 55K accounts on average, the medium branch peer group has 40K accounts on average, the small branch peer group has 20K accounts on average, and the very small branch peer group has 10K accounts on average.

FIG. 6C is a graph illustrating example average urbanity scores by peer branch groups according to the techniques of this disclosure. The graph in the example shown in FIG. 6C includes bars 613-618 corresponding to the peer branch groups very large through very small, respective. For example, FIG. 6C shows that the very large branch peer group has an average urbanity score of 4.5, the large branch peer group has an average urbanity score of 4, the medium to large branch peer group has an average urbanity score of 3.5, the medium branch peer group has an average urbanity score of 3, the small branch peer group has an average urbanity score of 2.5, and the very small branch peer group has an average urbanity score of 2.

Figure 7:
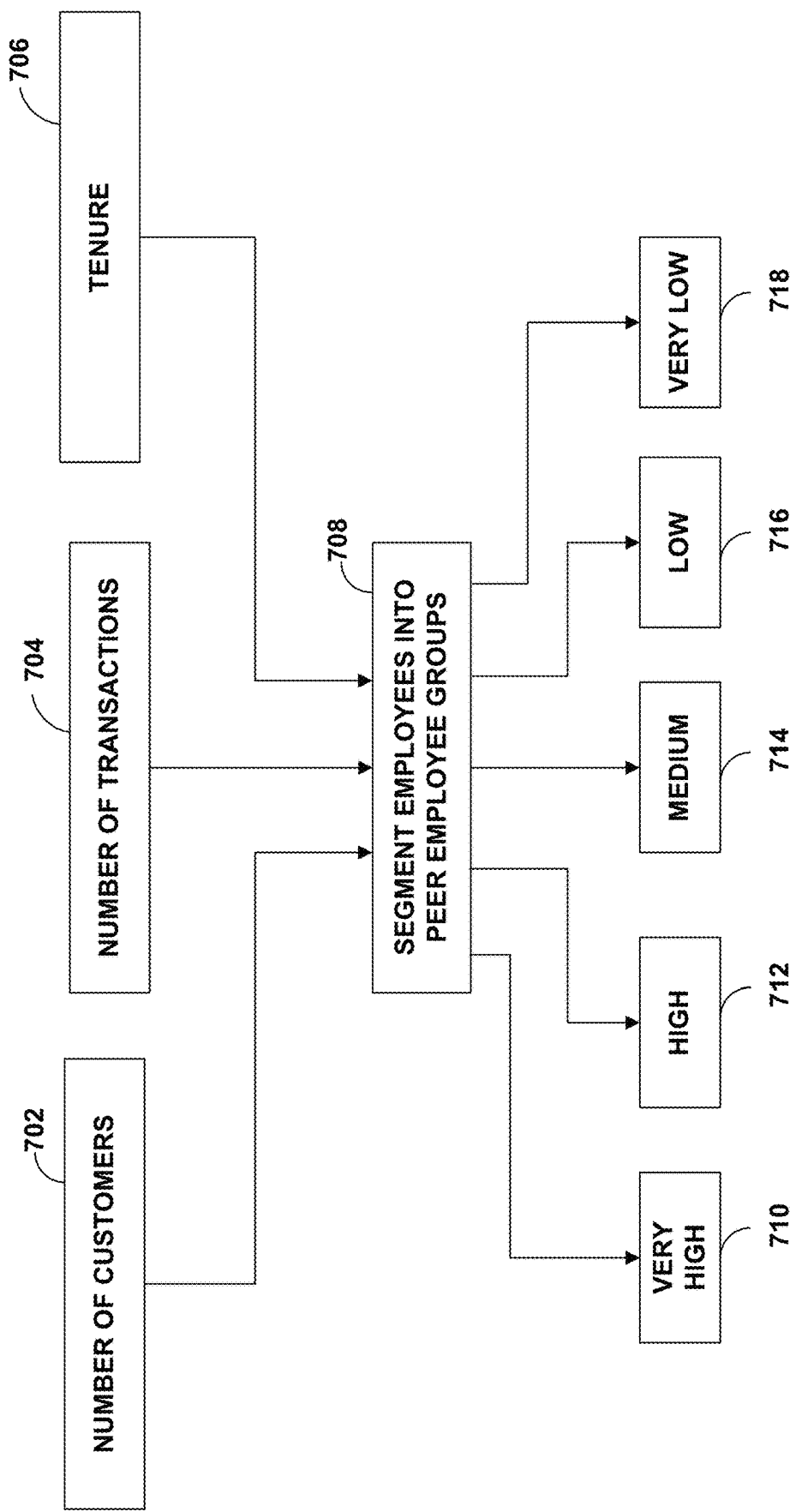
FIG. 7 is a conceptual diagram illustrating an example method of segmenting employees into peer employee groups according to the techniques of this disclosure.

FIG. 7 is a conceptual diagram illustrating an example method of segmenting employees into peer employee groups according to the techniques of this disclosure. For purposes of example and explanation, the method of FIG. 7 is explained with respect to central device 102 of FIGS. 1 and 2. However, it should be understood that other computer devices may be configured to perform this or a similar method.

In the example shown in FIG. 7, central device 102 segments the employees of a business enterprise (708) into a plurality of peer groups. Central device 102 uses as inputs the number of customers assisted over a period of time (e.g., a month, a quarter, six months, a year, or any other period of time) (702), the number of transactions performed during the same period of time (704), and the tenure (e.g., in the employee's current role). While three inputs are shown in FIG. 7, it should be understood that fewer or more inputs may be used to segment employees into a plurality of peer groups. Central device 102 produces as output the one or more employees that are associate with each peer employee group. In this example, the peer branch groups include a very high activity employee peer group (710), activity employee peer group (712), medium activity employee peer group (714), low activity employee peer group (716), and very low activity employee peer group (718). While five peer employee groups are shown in FIG. 5, it should be understood that fewer or more peer employee groups may be used to segment employees of a business enterprise.

In some examples, central device 102 may use any grouping or clustering techniques (e.g., k-means clustering, mean-shift clustering, hierarchical clustering) to segment the employees of a business enterprise into a plurality of peer employee groups at 708. In the example shown in FIG. 7, central device 102 may use k-means clustering with three-dimensional data inputs (i.e., 702, 704, and 706) and five cluster outputs (i.e., k=5, corresponding to peer employee groups 710, 712, 714, 716, 718, and 720). In some examples, central device 102 segments entities of a business enterprise into peer entity groups periodically (e.g., monthly).

Figure 8C:
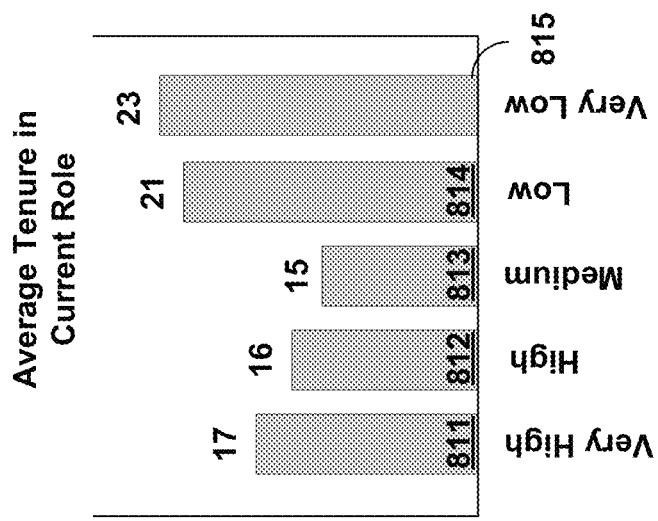
FIG. 8C is a graph illustrating example average tenure in current role by peer employee groups according to the techniques of this disclosure.
Figure 8B:
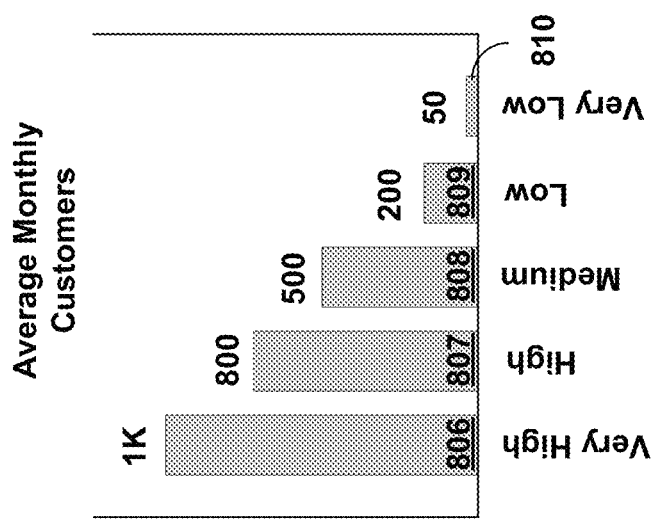
FIG. 8B is a graph illustrating example average monthly customers by peer employee groups according to the techniques of this disclosure.
Figure 8A:
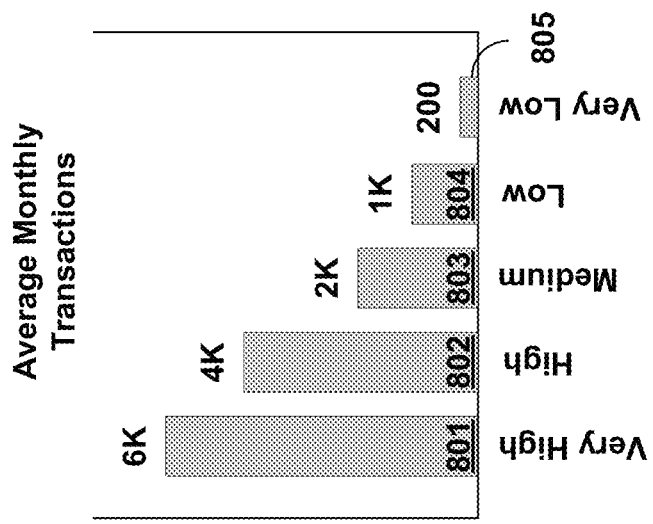
FIG. 8A is a graph illustrating example average monthly transactions by peer employee groups according to the techniques of this disclosure.

FIG. 8A is a graph illustrating example average monthly transactions by peer employee groups according to the techniques of this disclosure. The graph in the example shown in FIG. 8A includes bars 801-805 corresponding to the peer employee groups very high activity through very low activity, respectively. For example, FIG. 8A shows that the very high activity employee peer group performs 6,000 transactions a month on average, the high activity employee peer group performs 4,000 transactions a month on average, the medium activity employee peer group performs 2,000 transactions a month on average, the low activity employee peer group performs 1,000 transactions a month on average, and the very low activity employee peer group performs 200 transactions a month on average.

FIG. 8B is a graph illustrating example average monthly customers by peer employee groups according to the techniques of this disclosure. The graph in the example shown in FIG. 8B includes bars 806-810 corresponding to the peer employee groups very high activity through very low activity, respectively. For example, FIG. 8B shows that the very high activity employee peer group assists 1,000 customers a month on average, the high activity employee peer group assists 800 customers a month on average, the medium activity employee peer group assists 500 customers a month on average, the low activity employee peer group assists 200 customers a month on average, and the very low activity employee peer group assists 50 customers a month on average.

FIG. 8C is a graph illustrating example average tenure in current role by peer employee groups according to the techniques of this disclosure. The graph in the example shown in FIG. 8C includes bars 811-815 corresponding to the peer employee groups very high activity through very low activity, respectively. For example, FIG. 8C shows that the very high activity employee peer group has an average tenure of 17 months in the current role, the high activity employee peer group has an average tenure of 16 months in the current role, the medium activity employee peer group has an average tenure of 15 months in the current role, the low activity employee peer group has an average tenure of 21 months in the current role, and the very low activity employee peer group has an average tenure of 23 months in the current role.

Figure 9:
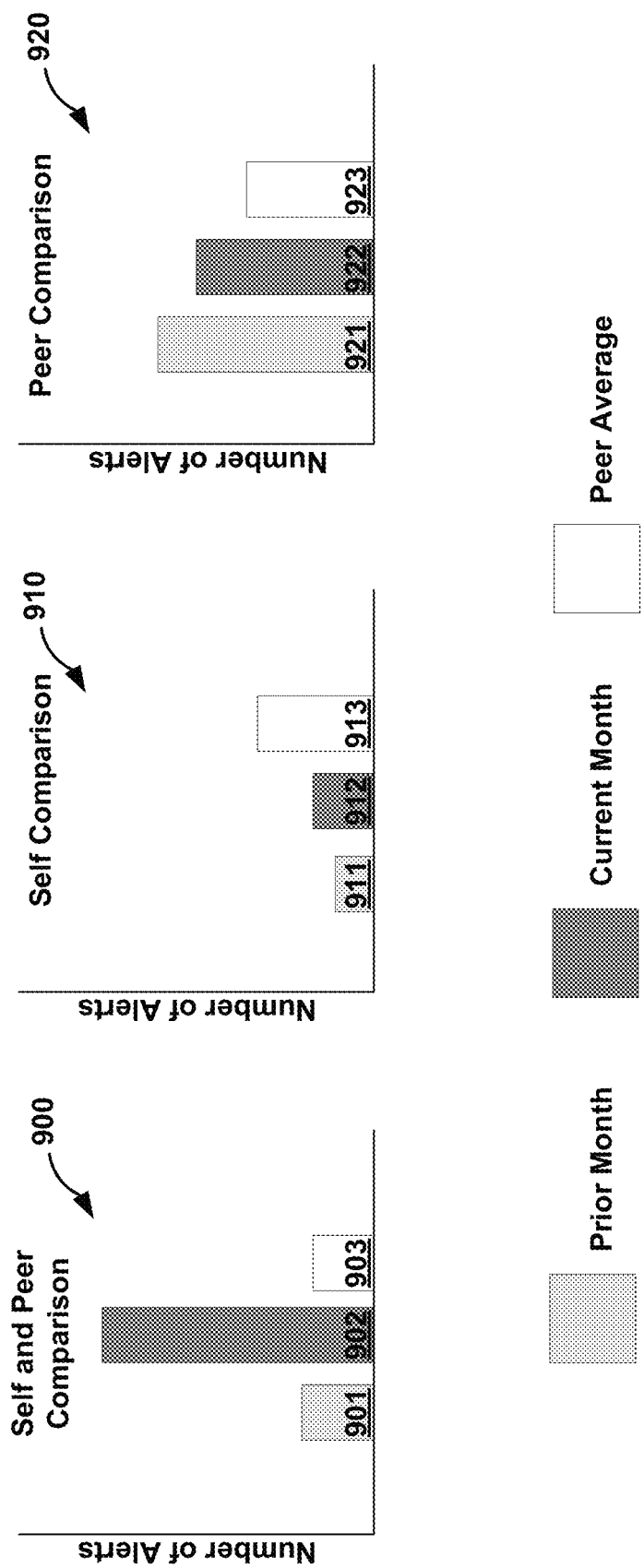
FIG. 9 illustrates example graphs of alert volume comparisons according to the techniques of this disclosure.

FIG. 9 illustrates example graphs of alert volume comparisons according to the techniques of this disclosure. In particular, FIG. 9 illustrates graph 900 with bar 901 representing an entity's alert volume for the prior month, bar 902 representing the entity's alert volume for the current month, and bar 903 representing the average alert volume for the entity's peer group for the current month. In some examples, bar 901 represents a historic baseline threshold and bar 903 represents a peer group baseline threshold. As shown in graph 900, the entity's current alert volume (i.e., bar 902) exceeds both entity's alert volume for the prior month (i.e., bar 901) and the average alert volume for the entity's peer group for the current month (i.e., bar 903), which would result in the central deice 102 generating a "high level" meta-alert (e.g., as described above with reference to FIG. 3).

FIG. 9 illustrates another alert volume comparison example in graph 910, which includes bar 911 representing an entity's alert volume for the prior month, bar 912 representing the entity's alert volume for the current month, and bar 913 representing the average alert volume for the entity's peer group for the current month. In some examples, bar 911 represents a historic baseline threshold and bar 913 represents a peer group baseline threshold. As shown in graph 910, the entity's current alert volume (i.e., bar 912) exceeds entity's alert volume for the prior month (i.e., bar 911) but not the average alert volume for the entity's peer group for the current month (i.e., bar 913), which would result in the central deice 102 generating a meta-alert "warning" (e.g., as described above with reference to FIG. 3).

FIG. 9 illustrates another alert volume comparison example in graph 920, which includes bar 921 representing an entity's alert volume for the prior month, bar 922 representing the entity's alert volume for the current month, and bar 923 representing the average alert volume for the entity's peer group for the current month. In some examples, bar 921 represents a historic baseline threshold and bar 923 represents a peer group baseline threshold. As shown in graph 920, the entity's current alert volume (i.e., bar 922) exceeds the average alert volume for the entity's peer group for the current month (i.e., bar 923) but not entity's alert volume for the prior month (i.e., bar 921), which would result in the central deice 102 generating a meta-alert "warning" (e.g., as described above with reference to FIG. 3).

The alert volume comparisons in FIG. 9 show how trends or spikes in alert volumes may be detected in accordance with techniques of this disclosure. For example, graph 900 shows a very bad month for an entity because that entity performed far worse than in the previous month and its peer group average (e.g., the entity's current alert volume 902 exceeds both the historic alert volume 901 and the average peer group alert volume 903 by over 100%). Graph 910 shows a bad month for an entity because that entity performed worse than in the previous month but just under its peer group average (e.g., the entity's current alert volume 912 exceeds the historic alert volume 911 but not the average peer group alert volume 913). In some examples, the graph 910 may represent the scenario in which a new policy increased alert volumes across the business enterprise. Graph 920 shows that the entity repeatedly has high alert volumes (e.g., is a repeat offender) because that entity performed worse than its peer group average and, while it did not perform worse than its previous month, the entity's alert volume for the previous month was very large (e.g., the historic alert volume 911 is very large and the entity's current alert volume 922 exceeds the average peer group alert volume 923).

Figure 10:
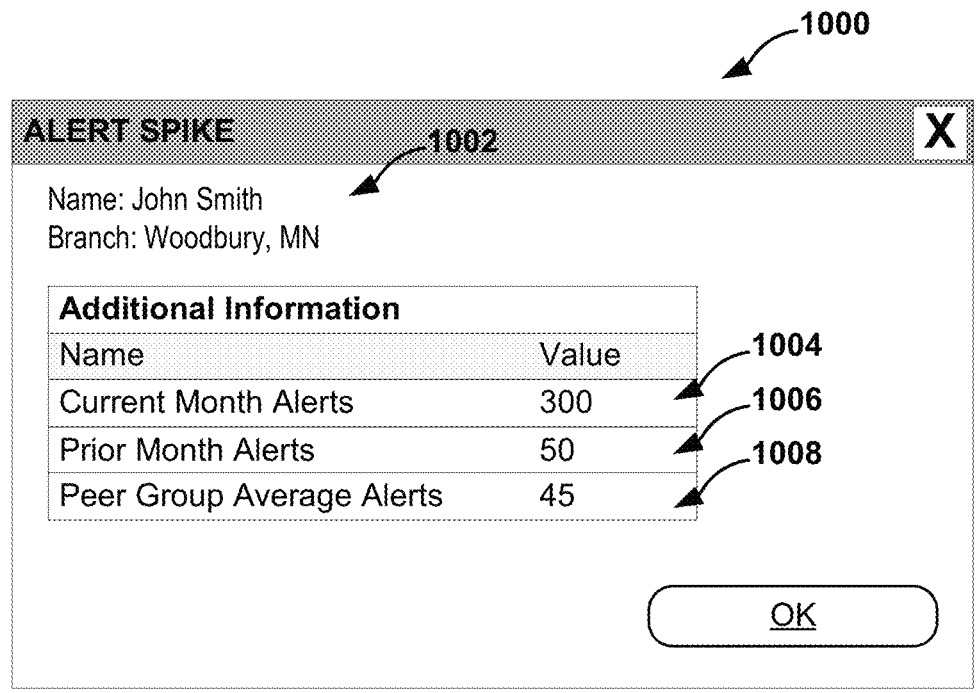
FIG. 10 is an illustration depicting a meta-alert according to the techniques of this disclosure.

FIG. 10 is an illustration depicting meta-alert 1000 according to the techniques of this disclosure. In the example shown in FIG. 10, meta-alert 1000 is a pop-up window comprising meta-alert information, including identifier information 1002 for an employee, the employee's alert volume 1004 for the current month, the employee's historic alert volume 1006 for the previous month, or an average employee peer group alert volume 1008 corresponding the employee for the current month. In this example, meta-alert 1000 may be a "high level" alert because the employee's alert volume 1004 exceeds both the employee's historic alert volume 1006 and the average employee peer group alert volume 1008. In other examples, the meta-alert may be an email, text message, or any other electronic communication. For example, a meta-alert warning or early warning may be communicated in an email message. In some examples, the meta-alert information may be incorporated into a report includes meta-alert information for each entity under each manager's supervision.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:
1. A method comprising:
generating, by one or more user-facing computing devices within a computing system of an enterprise business, a plurality of alerts corresponding to an entity of a plurality of entities within the enterprise business, wherein each alert of the plurality of alerts indicates a type of abnormal behavior arising from a transaction associated with the entity and performed by or on behalf of a customer of the enterprise business;
receiving, by a central computing device within the computing system and from the one or more user-facing computing devices, alert information for the plurality of alerts corresponding to the entity and entity information for the entity;
segmenting, by the central computing device, the plurality of entities into peer entity groups, wherein segmenting the plurality of entities into peer entity groups includes performing k-means clustering on the plurality of entities based on a plurality of inputs;
determining, by the central computing device and based on the entity information, a first baseline threshold based on an average alert volume for a peer entity group of the entity during a first period of time;
transmitting, by the central computing device and to one or more supervisor-facing computing devices within the computing system, a meta-alert for the entity based on an alert volume for the entity during the first period of time being greater than or equal to the first baseline threshold; and
displaying, by the one or more supervisor-facing computing devices, the meta-alert to a supervisor associated with the entity.
2. The method of claim 1, wherein transmitting the meta-alert for the entity comprises transmitting, by the central computing device and to the one or more supervisor-facing computing devices within the computing system, one of:

a meta-alert warning based on the alert volume for the entity being greater than or equal to the first baseline threshold and less than a second baseline threshold based on an historic alert volume for the entity during a second period of time, or a high level meta-alert based on the alert volume for the entity being greater than or equal to both of the first baseline threshold and the second baseline threshold.

3. The method of claim 2, further comprising displaying, by the one or more supervisor-facing computing devices, the high level meta-alert as a pop-up window including meta-alert information to the supervisor associated with the entity, wherein the meta-alert information comprises an identifier corresponding to the entity, the alert volume for the entity during the first period of time, the historic alert volume for the entity during the second period of time, and the average alert volume for the peer entity group of the entity during the first period of time.

4. The method of claim 2, wherein transmitting the meta-alert warning comprises communicating the meta-alert warning as an email including meta-alert information to the supervisor associated with the entity, wherein the meta-alert information comprises an identifier corresponding to the entity, the alert volume for the entity during the first period of time, the historic alert volume for the entity during the second period of time, and the average alert volume for the peer entity group of the entity during the first period of time.

5. The method of claim 1, further comprising determining, by the central computing device and based on the entity information, a second baseline threshold based on an historic alert volume for the entity during a second period of time.

6. The method of claim 1, wherein determining the first baseline threshold comprises receiving, by the central computing device and from the one or more supervisor-facing computing devices, the first baseline threshold, wherein the first baseline threshold is manually set or changed via the one or more supervisory-facing computing devices.

7. The method of claim 1, wherein determining the first baseline threshold includes:
adjusting, by the central computing device, the first baseline threshold based on a first floor calibration value if an initially determined first baseline threshold is less than the first floor calibration value.

8. The method of claim 1, wherein the plurality of entities comprises branches of the enterprise business and the plurality of inputs includes a number of accounts per branch, a number of employees per branch, and an urbanity score per branch.

9. The method of claim 1, wherein the plurality of entities comprises employees of the enterprise business and the plurality of inputs includes an average number of customers per employee, an average number of transactions per employee, and an average tenure in current role per employee.

10. The method of claim 5, further comprising transmitting, by the central computing device and to the one or more supervisor-facing computing devices within the computing system, a meta-alert early warning for the entity based on the alert volume for the entity being greater than or equal to the second baseline threshold and less than the first baseline threshold.

11. A computing system of an enterprise business, the computing system comprising:
one or more user-facing computing devices configured to generate a plurality of alerts corresponding to an entity of a plurality of entities within the enterprise business, wherein each alert of the plurality of alerts indicates a type of abnormal behavior arising from a transaction associated with the entity and performed by or on behalf of a customer of the enterprise business;

a central computing device configured to:
receive, from the one or more user-facing computing devices, alert information for the plurality of alerts corresponding to the entity and entity information for the entity, segment the plurality of entities into peer entity groups, wherein to segment the plurality of entities into peer entity groups, the central computing device is configured to perform k-means clustering on the plurality of entities based on a plurality of inputs, determine, based on the entity information, a first baseline threshold based on an average alert volume for a peer entity group of the entity during a first period of time, and transmit, to one or more supervisor-facing computing devices within the computing system, a meta-alert for the entity based on an alert volume for the entity during the first period of time being greater than or equal to the first baseline threshold; and the one or more supervisor-facing computing devices configured to display the meta-alert to a supervisor associated with the entity.

12. The computing system of claim 11, wherein to transmit the meta-alert for the entity the central computing device is configured to transmit, to the one or more supervisor-facing computing devices, one of:
a meta-alert warning based on the alert volume for the entity being greater than or equal to the first baseline threshold and less than a second baseline threshold based on an historic alert volume for the entity during a second period of time, or a high level meta-alert based on the alert volume for the entity being greater than or equal to both of the first baseline threshold and the second baseline threshold.

13. The computing system of claim 12, wherein the one or more supervisor-facing computing devices are configured to display the high level meta-alert as a pop-up window including meta-alert information to the supervisor associated with the entity, wherein the meta-alert information comprises an identifier corresponding to the entity during the second period of time, the alert volume for the entity during the first period of time, the historic alert volume for the entity, and the average alert volume for the peer entity group of the entity during the first period of time.

14. The computing system of claim 12, wherein to transmit the meta-alert warning, the central computing device is configured to communicate the meta-alert warning as an email including meta-alert information to the supervisor associated with the entity, wherein the meta-alert information comprises an identifier corresponding to the entity, the alert volume for the entity during the first period of time, the historic alert volume for the entity during the second period of time, and the average alert volume for the peer entity group of the entity during the first period of time.

15. The computing system of claim 11, wherein the central computing device is configured to determine, based on the entity information, a second baseline threshold based on an historic alert volume for the entity during a second period of time.

16. The computing system of claim 11, wherein to determine the first baseline threshold, the central computing device is configured to receive, from the one or more supervisor-facing computing devices, the first baseline threshold, wherein the first baseline threshold is manually set or changed via the one or more supervisory-facing computing devices.

17. The computing system of claim 11, wherein the plurality of entities comprises branches of the enterprise business and the plurality of inputs includes a number of accounts per branch, a number of employees per branch, and an urbanity score per branch.

18. The computing system of claim 11, wherein the plurality of entities comprises employees of the enterprise business and the plurality of inputs includes an average number of customers per employee, an average number of transactions per employee, and an average tenure in current role per employee.

19. The computing system of claim 15, wherein the one or more processors are configured to transmit, to the one or more supervisor-facing computing devices, a meta-alert early warning for the entity based on the alert volume for the entity being greater than or equal to the second baseline threshold and less than the first baseline threshold.

20. A non-transitory computer-readable medium storing instructions that when executed cause one or more processors within a computing system of an enterprise business to:
- generate, by one or more user-facing computing devices within the computing system, a plurality of alerts corresponding to an entity of a plurality of entities within the enterprise business, wherein each alert of the plurality of alerts indicates a type of abnormal behavior arising from a transaction associated with the entity and performed by or on behalf of a customer of the enterprise business;
- receive, by a central computing device within the computing system and from the one or more user-facing computing devices, alert information for the plurality of alerts corresponding to the entity and entity information for the entity;
- segment, by the central computing device, the plurality of entities into peer entity groups, wherein to segment the plurality of entities into peer entity groups, the instructions cause the one or more processors to perform k-means clustering on the plurality of entities based on a plurality of inputs;
- determine, by the central computing device and based on the entity information, a first baseline threshold based on an average alert volume for a peer entity group of the entity during a first period of time;
- transmit, by the central computing device and to one or more supervisor-facing computing devices within the computing system, a meta-alert for the entity based on an alert volume for the entity during the first period of time being greater than or equal to; and
- display, by the one or more supervisor-facing computing devices, the meta-alert to a supervisor associated with the entity.

* * * * *

UNITED STATES PATENT AND TRADEMARK OFFICE
CERTIFICATE OF CORRECTION

PATENT NO. : 11,715,054 B1
APPLICATION NO. : 17/456107
DATED : August 1, 2023
INVENTOR(S) : Daniel Jeffery Johnson et al.

Page 1 of 1

It is certified that error appears in the above-identified patent and that said Letters Patent is hereby corrected as shown below:

In the Claims

Column 18, Line 23-24 (Claim 20): Replace "greater than or equal to; and display" with --greater than or equal to a first baseline threshold; and display--

Signed and Sealed this
Fifteenth Day of April, 2025

Coke Morgan Stewart
*Acting Director of the United States Patent and Trademark Office*